Dec. 12, 1944.  F. B. HARVUOT  2,365,074
STRAINER
Filed Dec. 31, 1941  4 Sheets-Sheet 1

Frank B. Harvuot
INVENTOR.

BY Edmund W. E. Kamm
ATTORNEY

Dec. 12, 1944.  F. B. HARVUOT  2,365,074
STRAINER
Filed Dec. 31, 1941  4 Sheets-Sheet 4

Frank B. Harvuot
INVENTOR.

BY Edmund W. E. Kamm
ATTORNEY

Patented Dec. 12, 1944

2,365,074

UNITED STATES PATENT OFFICE 2,365,074

STRAINER

Frank B. Harvuot, Fort Wayne, Ind., assignor to S. F. Bowser & Company, Incorporated, Fort Wayne, Ind., a corporation of Indiana Application December 31, 1941, Serial No. 425,171

14 Claims. (Cl. 210—168)

This invention relates to strainers for use in pipe lines in which it is necessary to maintain a continuous flow. More specifically, it relates to a two-compartment strainer in which one compartment may be closed off from the pipe line so as to be cleaned, while the other side is cut in the line and handling the liquid flow.

It is an object of the invention to provide a valving mechanism which is operable by a single crank.

Another object of the invention is to provide means permitting ready access to all of the compartments.

Still another object of the invention is to provide a readily removable strainer assembly which can be taken out of the compartment and dismounted, strainer by strainer if necessary, for replacement or cleaning.

These and other objects will become apparent upon further consideration of this specification and the drawings which are attached hereto and made a part hereof, and in which.

Figure 1:
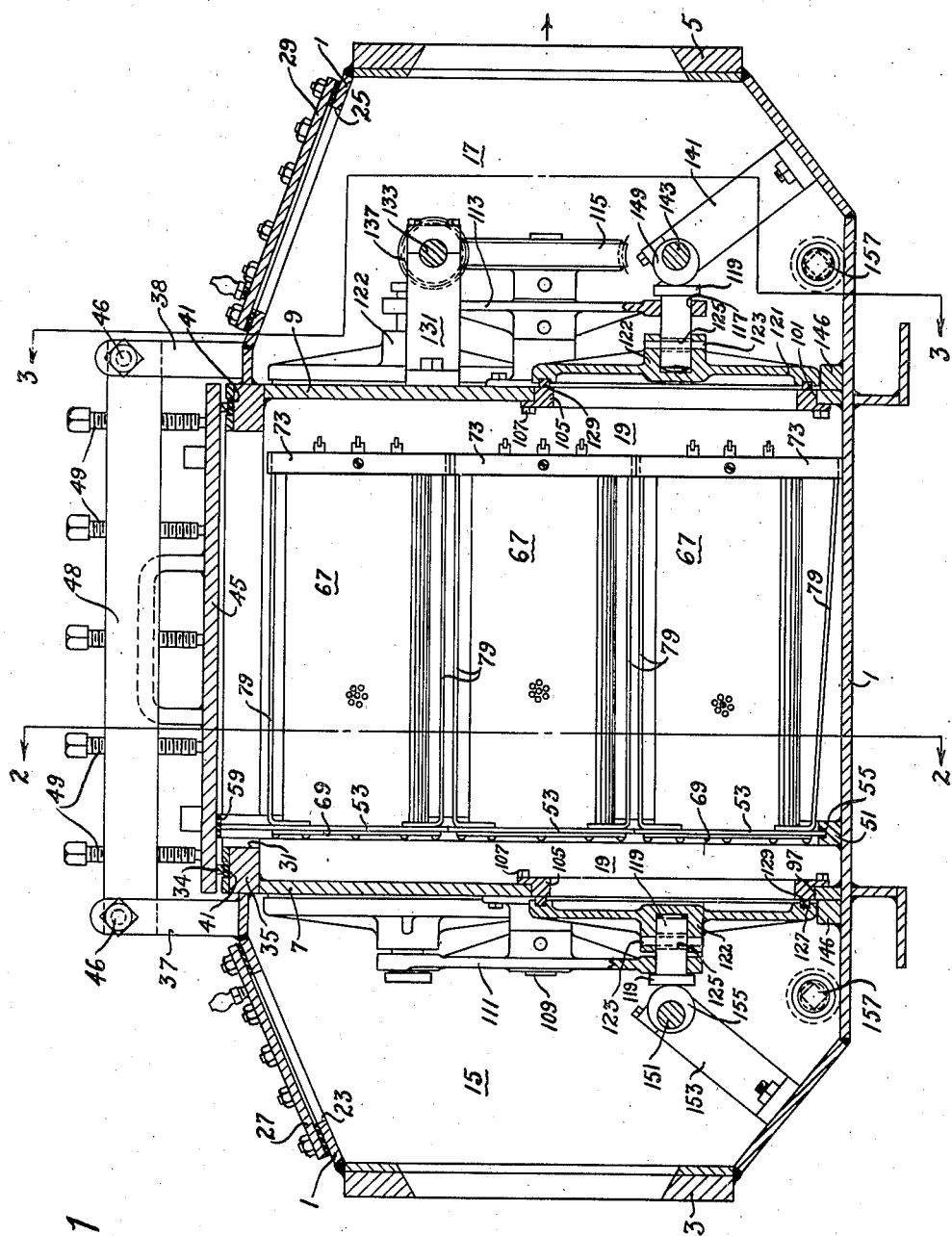
Figure 1 is a section taken on the line 1—1 of Figure 3, showing the screen bank and valve operating mechanism in elevation.

Referring now to Figure 1, the numeral 1 represents the exterior case or tank which is provided with flanges 3, 5 for connection with companion flanges of a pipe line not shown. The case has a central section which is in the form of a rectangular parallelopiped and which is surmounted at each end by a frusto pyramid.

Two vertical walls 7, 9 are disposed transversely of the case and are welded to it to divide the case into three longitudinal compartments. A vertical wall 11 is disposed longitudinally of the case between walls 7 and 9 and is welded to them. Incorporated in the wall 11 is the tube 13 which opens into the end compartments 15, 17 for a purpose to be described. The wall 11 forms with the walls 7 and 9, the two-screen compartments 19 and 21.

Openings 23 and 25 are formed in the upper walls of compartments 15 and 17 respectively and these openings are closed by cover plates 27 and 29.

The compartments 19 and 21 are provided with openings 31, 33 at the top to permit removal of the screens. The openings are each provided with an inwardly extending peripheral flange 35, 39 respectively which is grooved to receive a gasket 41, 43.

Hinged to the outer edges of the strainer case are doors 45, 47 which are adapted to close the openings 31, 33 respectively. Each door has a projecting, machined bead 34, 36 which is adapted to rest upon the associated gasket 41 or 43 so as to seal the compartment. Each door is provided with a suitable handle.

A plurality of pairs of upstanding yokes 37, 38 are mounted on the case adjacent the transverse edges of the doors, and the yokes are perforated at the upper ends to receive bolts 46. The latter also enter perforations in the ends of clamping bars 48 which are disposed longitudinally between the aligned pairs of yokes. Each bar 48 has a plurality of screws 49 mounted therein which are adapted to engage the associated door to hold the bead of the door firmly upon its gasket so that the screen compartment will be sealed. The screws also serve to support the lid at spaced points against any pressures in the case to prevent distortion of the door which might cause it to become unsealed.

Figure 2:
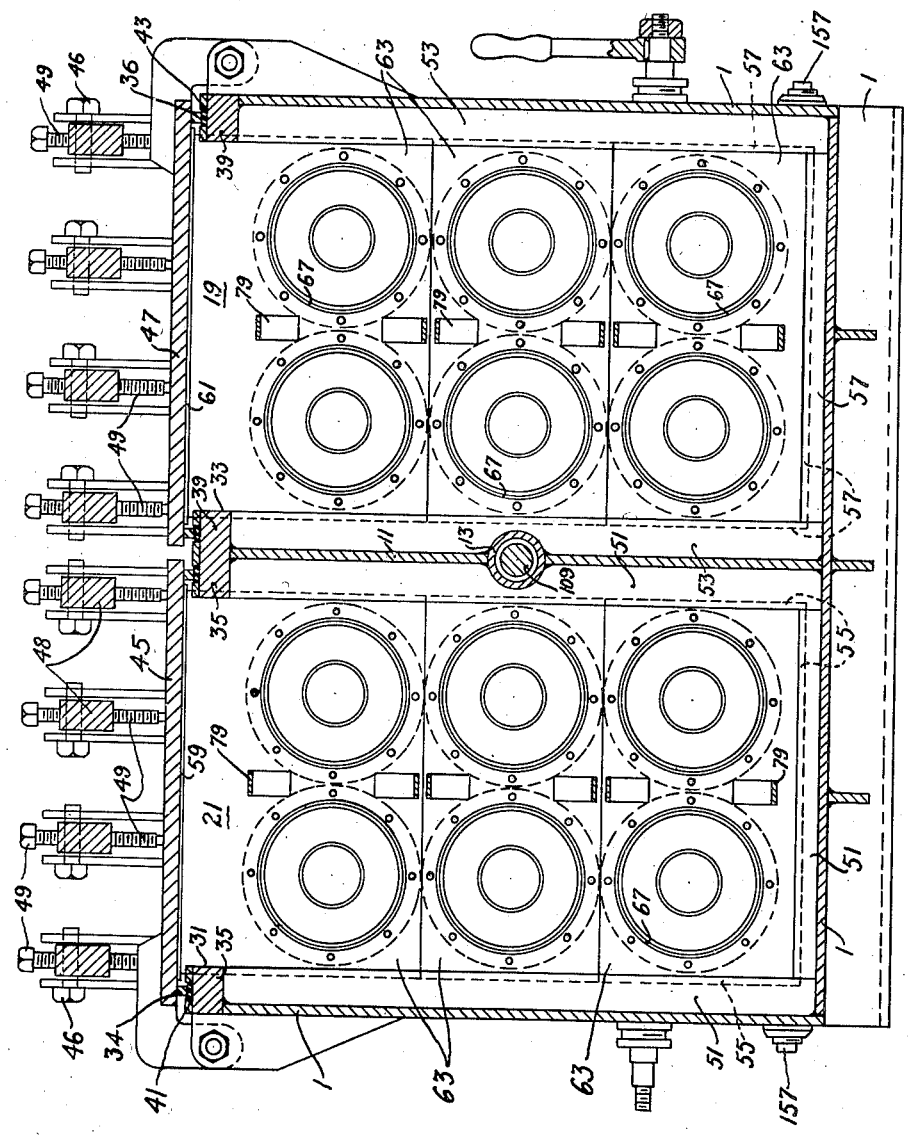
Figure 2 is a section taken on the line 2—2 of Figure 1, showing the screen compartments and screen banks.

Fixed to the side walls and bottom of the compartments 19 and 21, as is shown particularly in Figures 1 and 2, are flanges 51, 53 which are provided with machined grooves 55, 57. Fixed to the doors, in alignment with the flange are gaskets 59, 61.

Each screen bank is provided at one end with a support plate 63 which has machined edges. These support plates enter the grooves 55 or 57, depending upon the compartment in which they are mounted, and the gasket 59 or 61 contacts the upper edge of the uppermost plate. These plates, lying closely adjacent each other, form a substantial seal with each other and with the grooves so that they establish a virtual bulkhead across the compartment.

Figure 4:
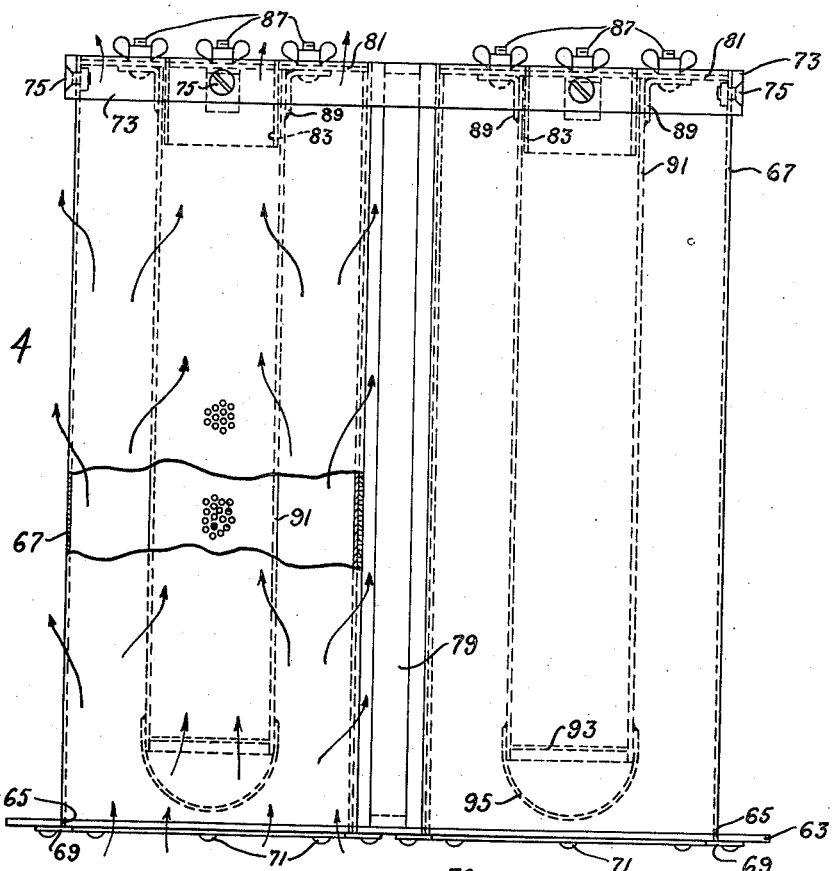
Figure 4 is a plan view of one section of a screen bank.
Figure 5:
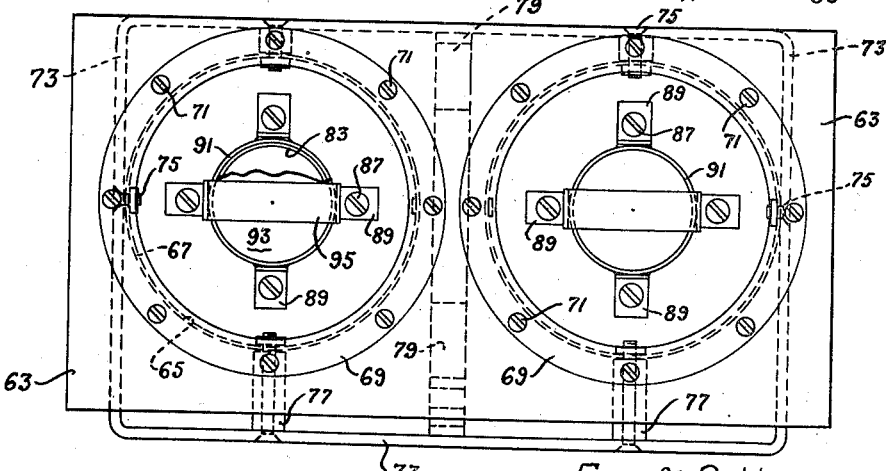
Figure 5 is an end elevation of the screen section of Figure 4 viewed from the bottom.

Referring now to Figures 4 and 5, which show the details of the lowermost screen bank, it will be seen that the end plate 63 is provided with a circular hole 65 of sufficient diameter to receive the larger screen 67 which has fixed to it a flange 69 which is held in place on the plate by suitable fastenings 71.

A rectangular frame 73 is provided at the end of the strainers opposite the plate 63 and the strainers are fixed thereto by means of screws 75. In the case of the lowermost bank, the lower side of the strainer is supported by a spacer 77 instead of directly by the frame 73. A pair of longitudinal straps 79 are disposed between the frame 73 and plate 63 and serve both as tension members to prevent the strainer being pulled apart and as handles for lifting a bank of screens from a compartment.

A perforated end plate 81 which is annular in form is set in the end of screen 67 opposite flange 69 and is soldered or otherwise fixed in place. A short tube 83 is fixed in said plate 81 and extends into the screen. Bolts 87 carry angle pieces 89 which have one leg parallel to the plate 81 and the other extending in the direction of the tube 83.

A second cylindrical strainer 91 having an internal diameter slightly greater than the outside diameter of the tube 83 is fitted between the tube and the angle pieces 89. The inner strainer 91 is thus held in position over the outlet tube 83. This strainer 91 is provided at its other end with a perforated head 93 and a bail 95.

Figure 3:
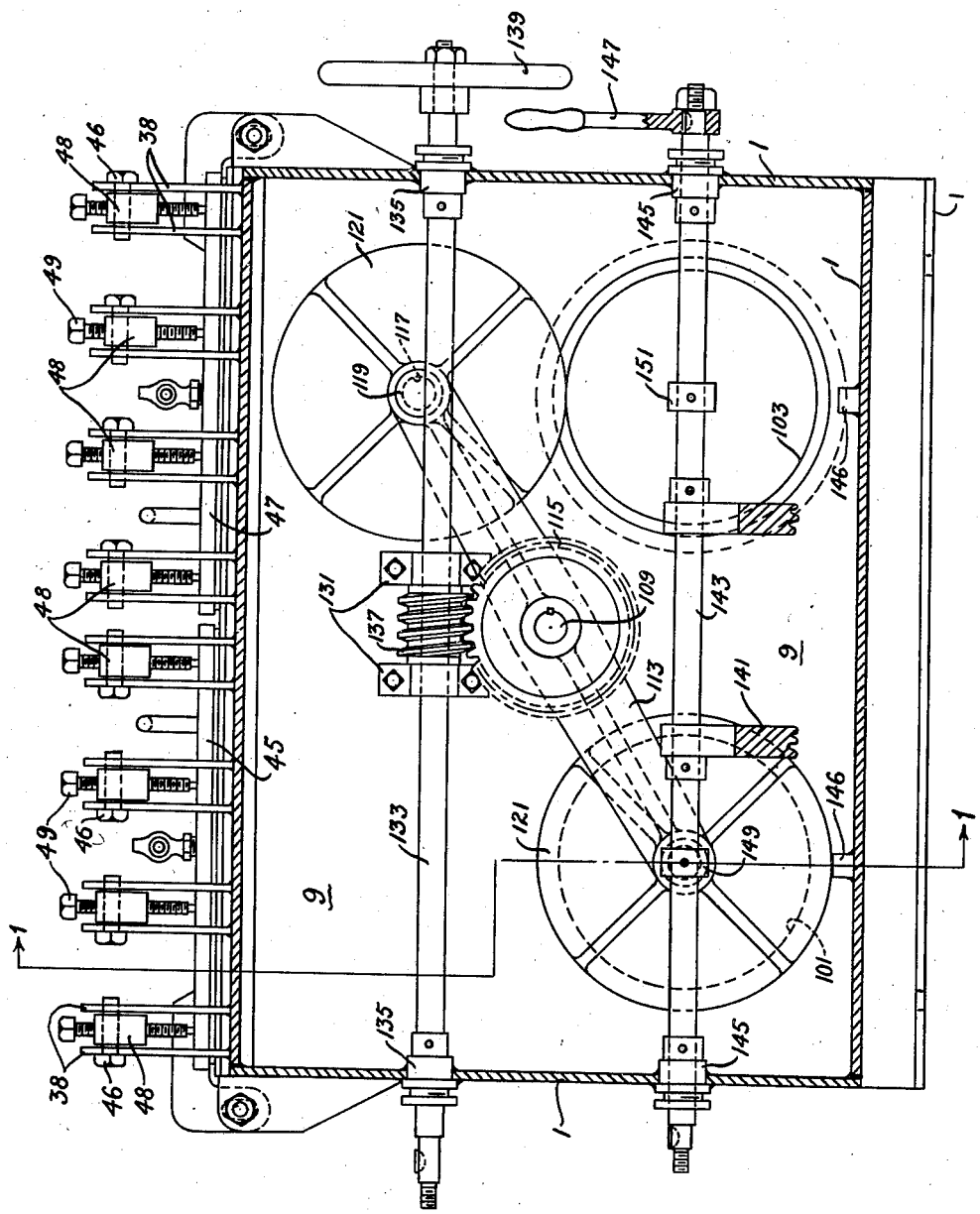
Figure 3 is a section taken on the line 3—3 of Figure 1, showing the valves and valve operating mechanism.

Referring now to Figures 1, 2 and 3, the wall 7 has an opening 97, and another which is not shown, which connect the lower portion of compartment 15 with the lower portion of compartments 19 and 21. Similarly, wall 9 has openings 101 and 103 which connect compartment 17 with the strainer compartments.

An annular valve seat 105 is inserted in each of the four openings and is held in place by fastenings 107. The seat may be adjusted by proper shims if required.

A shaft 109 passes through the tube 13 and enters both compartments 15 and 17 where it has fixed to it, at each end, a pair of cross arms 111, 113 which are pinned to the shaft in parallel relation. In the compartment 17, the shaft extends beyond the cross arm and carries a worm wheel 115.

The ends of the cross-arms are perforated as at 117 and in each perforation is mounted a headed pin 119. A valve 121 in the shape of a flat, cupped disc, is provided with a hub 122 in which the end of pin 119 is adapted to fit loosely so that the disc may tilt to a limited degree in any direction. A pin 123 enters an enlarged hole 125 in pin 119 and passes through the hub of the valve to hold the parts in their respective relations. The valve disc is provided with a groove 127 near its outer periphery and a sealing ring 129, preferably of bronze or other suitable material, is fixed in the disc for cooperation with the seat 105.

A pair of bearings 131 are mounted on plate 9 adjacent worm wheel 115 and a shaft 133 passes through stuffing boxes 135 in the case 1. A worm 137 is fixed to the shaft adjacent the wheel 115 and meshes therewith while a hand wheel 139 is fixed to drive the shaft.

Mounted in bearing blocks 141 in compartment 17 is a shaft 143 which is passed through the walls 1 of the case by stuffing boxes 145, and which has fixed to it an operating lever 147. Cams 149, 151 are fixed to the shaft in position adjacent the headed pins 119 when they are in the valve closed position. When a valve occupies this position the cam 149, when rotated, will force the pin 119 toward the valve and the valve ring 129 against the seat 105 so as to seal off the port leading to the screen compartment.

A similar valve camming structure is provided in compartment 15, in which the shaft 151 is mounted in bearing block 153 and cam 155 actuates the pin 119. Stops 146 are provided for stopping the valves in closing position.

Suitable drain plugs 157 may be provided if desired.

*Operation*

If we assume that the valves are in the positions shown in Figures 1 and 3, it will be seen that the strainer chamber 19 is sealed off and that any liquid entering the compartment 15 will pass into compartment 21 where it will pass through the plates 63 and into the interior of the large strainer 67 where the flow will be through the strainer, into the compartment and out through the port 103 (Fig. 3).

There is also a path for liquid from the interior of strainer 67 through strainer 91, out through the short pipe 83, thence through port 103 into 17 and out. These flows are shown by arrows in Figure 4. By the described construction of the strainers a greater strainer area is secured for a given cubic strainer compartment space than would be available if only a single screen were used.

If it becomes necessary to clean the compartment 21 and the screens therein, the operator will first release the cams by rotating the two shafts 143, 151. He will then rotate shaft 133 by means of handwheel 139. The worm 137 and wheel 115 will rotate shaft 109 and both cross arms 111, 113. This motion continues until the valve which is being lowered into closing position strikes its stop 146. In this position the compartment 21 will be closed off by the valves and compartment 19 will be opened so that the liquid will flow through it.

The shafts 143 and 151 will again be rotated to apply the cams to force the valves in sealing position on the valve seats of chamber 19.

The operator will next loosen the screws 49 bearing on the door 47, remove one of the bolts 46 in each bar 48, swing the bars about the remaining bolts out of the way of door 47 and then open the door. This opens the screen compartment so that by grasping the straps 79 on the screen banks, the latter can be lifted out of the compartment. In order to clean the screens, the operator withdraws the inner screen 91 by pulling on the bail so as to withdraw the other end from the tube 83 and angles 89. If necessary, the wing bolts 87 may be loosened. Removal of strainer 91 permits it to be scrubbed or otherwise cleaned and it also gives access to the interior of strainer 67 for cleaning.

When the screens and the compartment have been cleaned and the strainer banks reassembled, the banks will again be inserted in the compartment which is again closed, whereupon it is again ready for duty as soon as it becomes necessary to clean the compartment 19.

The strainers or screens are preferably made of .054 inch thick, cold rolled copper perforated with $\frac{3}{32}$ inch holes staggered on $\frac{9}{64}$ inch centers. This will yield about 51 holes per square inch. If it is desired to reduce the size of the filtering openings, either the size of the holes in the perforated walls can be changed or a liner of screen wire having smaller holes can be placed inside the large strainer 67 and around the outside of the small strainer 91. In this construction, the heavy screen will serve to support the lighter screen against the flow of liquid.

It is obvious, of course, that any suitable material other than copper may be used for the strainers, depending upon the conditions under which the device is used.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a strainer, the combination of a casing having means forming two strainer compartments, strainer means comprising header plates and a strainer supported on each plate, each compartment having an inlet and an outlet, a cover for each compartment, channels mounted on the bottom and sides of said compartments to receive certain of said screen header plates, said plates in each compartment being disposed in vertical edgewise, abutting relation with each other, sealing means mounted on said cover adapted to engage the upper header plate, said header plates being disposed transversely across said compartments to form two chambers in each and preventing passage of any substantial amount of liquid from one chamber to the other except through the screens.

2. In a strainer, the combination of a casing having means forming two strainer compartments, strainer means comprising header plates disposed in vertical edgewise, abutting relation with each other, and a strainer supported on each plate, each compartment having an inlet and an outlet, a cover for each compartment, channels mounted on the bottom and sides of said compartments to receive said screen header plates, sealing means mounted on said cover adapted to engage the upper header plate, said header plates being disposed transversely across said compartments to form two chambers in each and preventing passage of any substantial amount of liquid from one to the other except through the screens, valve means mounted at the inlet and outlet of said compartments and operable for simultaneously opening or closing the inlet and outlet of a compartment, and means for operating said valves.

3. In a strainer, the combination of means forming an inlet chamber, an outlet chamber, and two strainer chambers disposed therebetween, each strainer chamber having valve ports opening into said inlet and outlet chambers, valve means mounted in said inlet and outlet chambers, comprising a rotatable shaft, valves carried by said shaft and adapted to be revolved thereby into position over one or the other of said corresponding ports, said inlet and outlet ports of one strainer chamber being disposed about said shaft in angularly spaced relation with the corresponding ports of the other strainer chamber, means for rotating said shaft from the exterior of said chamber, and means in said inlet and outlet chambers operable from the exterior thereof for pressing said valves into sealing relation with said ports.

4. In a strainer, the combination of means forming an inlet chamber, an outlet chamber and two strainer chambers, each strainer chamber having a valve port opening into each of said inlet and outlet chambers, valve means mounted in said inlet and outlet chambers, comprising a shaft, valves carried by said shaft and adapted to be revolved thereby into position over one or the other of said ports, said inlet and outlet ports of one strainer chamber being disposed about said shaft in angularly spaced relation with the corresponding ports of the other chamber, and means for rotating said shaft from the exterior of said strainer, said valves being mounted for movement relative to said shaft toward and away from said ports, and means for seating said valves in sealing relation on said ports.

5. In a strainer, the combination of means forming an inlet chamber, an outlet chamber, and two strainer chambers, each strainer chamber having an inlet and an outlet valve port therein provided with a valve seat, a rotatable shaft, said inlet and outlet ports of one strainer chamber being disposed about said shaft in angularly spaced relation with the corresponding ports of the other chamber, means for rotating it at will, valve arms mounted on each end of said shaft, a valve mounted on each arm for movement toward and away from sealing engagement with a seat, said arms being arranged to revolve said valves into position over said ports, and means operable thereafter for forcing said positioned valves into sealing contact with said seats.

6. In a strainer, the combination of means forming an inlet chamber, an outlet chamber and two strainer chambers, ports connecting each of said strainer chambers with said inlet and outlet chambers, a valve for each port, a plurality of arms, means for supporting said arms for rotation, said inlet and outlet ports of one strainer chamber being disposed about said supporting means in angularly spaced relation with the corresponding ports of the other strainer chamber, means for supporting said valves on said arms for rotation thereby into alignment with said ports comprising a headed pin passing through said arms, means for rotating said arms to position the valves in axial alignment with said ports, means mounting a valve on said pin for limited movement relative thereto, and means for forcing said pin and said valve into sealing relation over said port, said forcing means comprising a cam acting upon the head of said pin.

7. In a strainer, the combination of means forming an inlet chamber, an outlet chamber and two strainer chambers, ports connecting each of said strainer chambers with said inlet and outlet chambers, a valve for each port, a plurality of arms, means for supporting said arms for rotation, said inlet and outlet ports of one strainer chamber being disposed about said supporting means in angularly spaced relation with the corresponding ports of the other strainer chamber, means for supporting said valves on said arms for rotation thereby into alignment with said ports comprising a headed pin passing through said arms, means mounting a valve on said pin for limited movement relative thereto, and means for forcing said pin and said valve into sealing relation over said port, said forcing means comprising a cam disposed in alignment with said port and manual means for operating said cam.

8. In a strainer, the combination of means forming an inlet chamber, an outlet chamber and two strainer chambers, each strainer chamber having valve ports opening into said inlet and outlet chambers, valve means mounted in said inlet and outlet chambers, comprising a shaft, valves carried by said shaft and adapted to be revolved thereby into position over one or the other of said ports, said inlet and outlet ports of one strainer chamber being disposed about said shaft in angularly spaced relation with the corresponding ports of the other chamber, means for rotating said shaft from the exterior of said strainer, and stop means for positioning the valves over said ports.

9. In a strainer structure, means forming a chamber having an inlet and an outlet port, means forming a channel in the walls of said chamber at a point intermediate of said ports, a plurality of header plates adapted to be slidably mounted in said channel to substantially seal off said inlet from said outlet port, an opening in each plate, and strainers mounted on said plates over said openings.

10. In a strainer structure, means forming a chamber having an inlet and an outlet port, means forming a channel in the walls of said chamber at a point intermediate of said ports, a plurality of header plates adapted to be mounted in said channel to substantially seal off said inlet from said outlet port, openings in said plates, tubular strainers mounted at one end on said plates over said openings, and means extending from said plates for supporting the other ends of said strainers.

11. In a strainer structure, means forming a chamber having an inlet and an outlet port, means forming a channel in the walls of said chamber at a point intermediate of said ports, a header plate adapted to be slid edgewise into said channel and to form a seal therewith, a lid for said chamber, sealing means on said lid to engage the header and complete the seal about it, means for holding said lid in place, an opening in said header plate and a strainer mounted over said opening.

12. In a strainer structure, means forming a chamber having an inlet and an outlet port, means forming a channel in the walls of said chamber between said ports, a plurality of header plates adapted to be mounted in said channel in sealing relation to it and to each other so as to substantially seal off said inlet from said outlet port, a plurality of openings in said plates, a plurality of tubular strainers mounted at one end on said plates over said openings, means extending from said plates for supporting the other ends of said strainers, said strainers comprising heads which are adapted to close said other ends, tubes set in said heads, and additional tubular strainers fixed one to each of said tubes and disposed within said first named strainers.

13. In a strainer structure, an outer tubular strainer having an inlet opening at one end and a head at the other end having an outlet opening, means for mounting a second tubular strainer on said head within said first named strainer so as to discharge through said outlet opening, said mounting means comprising a tube set in said head with which said second strainer is slidingly engaged, and removable clamping means for holding said second strainer on said tube.

14. In a strainer, the combination of a casing having means forming two strainer compartments, a shaft disposed longitudinally of said compartments and carrying cross arms at each end, means mounting said shaft for rotation between two positions, a valve mounted at the end of each cross arm, inlet ports in said compartments disposed at one end of said shaft and so as to be alternately covered by the valves carried by the end of the shaft adjacent the inlet ports as the shaft occupies its two positions, outlet ports in said compartments disposed at the other end of said shaft in alignment with their corresponding inlet ports, so as to be alternately covered by said valves carried by the corresponding end of the shaft as said shaft occupies its two positions, whereby one compartment will be open and the other will be closed.

FRANK B. HARVUOT.